US008807310B2

(12) United States Patent
Takikawa et al.

(10) Patent No.: US 8,807,310 B2
(45) Date of Patent: Aug. 19, 2014

(54) FLUID TRANSMISSION APPARATUS

(75) Inventors: Yoshihiro Takikawa, Tsushima (JP); Kazuto Maruyama, Anjo (JP); Kazuhiro Itou, Anjo (JP)

(73) Assignee: Aisin Aw Co., Ltd., Aichi-Ken (JP)

( * ) Notice: Subject to any disclaimer, the term of this patent is extended or adjusted under 35 U.S.C. 154(b) by 323 days.

(21) Appl. No.: 13/222,712

(22) Filed: Aug. 31, 2011

(65) Prior Publication Data
US 2012/0080280 A1 Apr. 5, 2012

(30) Foreign Application Priority Data

Sep. 30, 2010 (JP) ................................ 2010-221332

(51) Int. Cl.
*F16H 45/02* (2006.01)
(52) U.S. Cl.
USPC .................... 192/3.29; 192/213.1; 192/213.2; 74/574.2
(58) Field of Classification Search
USPC ................ 192/3.29, 70.12; 74/574.2; 60/338
See application file for complete search history.

(56) References Cited

U.S. PATENT DOCUMENTS

| | | | |
|---|---|---|---|
| 6,026,940 A | 2/2000 | Sudau | |
| 6,688,441 B1 * | 2/2004 | Arhab et al. | ................. 192/3.29 |
| 8,161,739 B2 | 4/2012 | Degler et al. | |
| 8,342,306 B2 | 1/2013 | Werner et al. | |
| 8,403,762 B2 * | 3/2013 | Steinberger | ................. 464/68.1 |
| 2004/0226794 A1 | 11/2004 | Sasse et al. | |
| 2009/0125202 A1 | 5/2009 | Swank et al. | |
| 2010/0236228 A1 | 9/2010 | Degler et al. | |
| 2011/0031083 A1 | 2/2011 | Matsuoka et al. | |
| 2011/0192692 A1 | 8/2011 | Werner et al. | |
| 2011/0240429 A1 | 10/2011 | Heuler et al. | |
| 2012/0080280 A1 | 4/2012 | Takikawa et al. | |
| 2012/0080281 A1 | 4/2012 | Takikawa et al. | |
| 2012/0080282 A1 | 4/2012 | Takikawa et al. | |
| 2012/0111683 A1 | 5/2012 | Ito et al. | |

FOREIGN PATENT DOCUMENTS

| | | | | |
|---|---|---|---|---|
| DE | 102009042837 | * | 4/2010 | ............. F16F 15/14 |
| DE | 10 2009 002 481 A1 | | 6/2010 | |
| JP | 10-169756 A | | 6/1998 | |

(Continued)

OTHER PUBLICATIONS

U.S. Appl. No. 13/200,752, filed by Kazuyoshi Ito on Sep. 30, 2011.
International Search Report for corresponding International Patent Application No. PCT/JP2011/071455 mailed Dec. 27, 2011.

(Continued)

*Primary Examiner* — David D Le
*Assistant Examiner* — Stacey Fluhart
(74) *Attorney, Agent, or Firm* — Sughrue Mion, PLLC

(57) ABSTRACT

A fluid transmission apparatus including a pump impeller that is connected to an input member coupled to a motor; a turbine runner that is rotatable together with the pump impeller; a damper mechanism that includes an input element, an intermediate element engaged with the input element via a first elastic body and an output element engaged with the intermediate element via a second elastic body; a lock-up clutch mechanism; a dynamic damper that includes a mass body and a third elastic body engaged with the mass body; and a centrifugal pendulum vibration absorber that includes a support member and a plurality of mass bodies each oscillatable with respect to the support member. The third elastic body of the dynamic damper is engaged with one of the intermediate element and the output element. The centrifugal pendulum vibration absorber's support member is connected to the intermediate element or the output element.

9 Claims, 8 Drawing Sheets

(56) References Cited

FOREIGN PATENT DOCUMENTS

| | | |
|---|---|---|
| JP | 10-169758 A | 6/1998 |
| JP | 2004-308904 A | 11/2004 |
| JP | 2009-115112 A | 5/2009 |
| JP | 2009-243536 A | 10/2009 |
| JP | 2009-293671 A | 12/2009 |
| WO | 2009/067987 A1 | 6/2009 |
| WO | 2010/000220 A1 | 1/2010 |
| WO | 2010/043194 A1 | 4/2010 |
| WO | 2010/066665 A2 | 6/2010 |

OTHER PUBLICATIONS

International Search Report for corresponding International Patent Application No. PCT/JP2011/072282 mailed Dec. 13, 2011.
International Search Report for corresponding International Patent Application No. PCT/JP2011/071368 mailed Dec. 20, 2011.
U.S. Appl. No. 13/234,736, filed by Yoshihiro Takikawa on Sep. 16, 2011.
U.S. Appl. No. 13/233,637, filed by Yoshihiro Takikawa on Sep. 15, 2011.
International Search Report for corresponding International Patent Application No. PCT/JP2011/071369 mailed Dec. 20, 2011.

* cited by examiner

FLUID TRANSMISSION APPARATUS

INCORPORATION BY REFERENCE

The disclosure of Japanese Patent Application No. 2010-221332 filed on Sep. 30, 2010 including the specification, drawings and abstract is incorporated herein by reference in its entirety.

BACKGROUND OF THE INVENTION

The present invention relates to a fluid transmission apparatus that includes a dynamic damper and a centrifugal pendulum vibration absorber.

DESCRIPTION OF THE RELATED ART

As a fluid transmission apparatus of this type, conventionally, there has been suggested a fluid transmission apparatus which includes: a pump impeller that is connected to an input member coupled to a motor; a turbine runner that is rotatable together with the pump impeller; a damper mechanism that has an input element, an intermediate element engaged with the input element via first elastic bodies and an output element engaged with the intermediate element via second elastic bodies and coupled to an input shaft of a transmission; a lock-up clutch mechanism that is able to carry out lockup where the input member is engaged with the input element of the damper mechanism and that is able to cancel the lockup; a dynamic damper that is formed of elastic bodies (coil springs) and the turbine runner engaged with the elastic bodies; and a centrifugal pendulum vibration absorber that includes a support member and a plurality of mass bodies each oscillatable with respect to the support member (for example, see WO 2010/043194). In the fluid transmission apparatus, the dynamic damper is formed by engaging the turbine runner with the intermediate element of the damper mechanism via the elastic bodies, the support member of the centrifugal pendulum vibration absorber is substantially fixed to the turbine runner, and the elastic bodies of the dynamic damper are present upstream of the centrifugal pendulum vibration absorber.

However, as in the case of the above conventional fluid transmission apparatus, when the elastic bodies of the dynamic damper are present upstream of the centrifugal pendulum vibration absorber, vibrations applied from the centrifugal pendulum vibration absorber to the damper mechanism and vibrations applied from the dynamic damper to the damper mechanism are opposite in phase. Therefore, there is a concern that the vibration damping effect brought by the dynamic damper and the vibration damping effect brought by the centrifugal pendulum vibration absorber cancel each other and, as a result, a favorable vibration damping effect may not be obtained as a whole.

SUMMARY OF THE INVENTION

A main object of a fluid transmission apparatus according to the present invention is to make it possible to further effectively damp vibrations transmitted to an input member with a dynamic damper and a centrifugal pendulum vibration absorber.

The fluid transmission apparatus according to the present invention employs the following means to achieve the above main object.

A fluid transmission apparatus according to an aspect of the present invention includes: a pump impeller that is connected to an input member coupled to a motor; a turbine runner that is rotatable together with the pump impeller; a damper mechanism that includes an input element, an intermediate element engaged with the input element via a first elastic body and an output element engaged with the intermediate element via a second elastic body; a lock-up clutch mechanism that is able to carry out lockup where the input member is coupled to an input shaft of a transmission via the damper mechanism and that is able to cancel the lockup; a dynamic damper that includes a mass body and a third elastic body engaged with the mass body; and a centrifugal pendulum vibration absorber that includes a support member and a plurality of mass bodies each oscillatable with respect to the support member. In the fluid transmission apparatus, the third elastic body of the dynamic damper is engaged with one of the intermediate element and output element of the damper mechanism, and the support member of the centrifugal pendulum vibration absorber is connected to the one or the other of the intermediate element and output element of the damper mechanism.

The fluid transmission apparatus includes the dynamic damper and the centrifugal pendulum vibration absorber in order to damp vibrations transmitted to the input member. Then, in the fluid transmission apparatus, the third elastic body that constitutes the dynamic damper is engaged with one of the intermediate element and output element of the damper mechanism, and the support member of the centrifugal pendulum vibration absorber is connected to the one or the other of the intermediate element and output element of the damper mechanism. In this way, when the dynamic damper is connected to one of the intermediate element and output element of the damper mechanism and the centrifugal pendulum vibration absorber is connected to the one of the intermediate element and the output element or when the dynamic damper is connected to one of the intermediate element and output element of the damper mechanism and the centrifugal pendulum vibration absorber is connected to the other of the intermediate element and output element of the damper mechanism, the dynamic damper and the centrifugal pendulum vibration absorber are coupled to the damper mechanism independently (parallel). Therefore, it is possible to further effectively damp vibrations transmitted to the input member with the dynamic damper and the centrifugal pendulum vibration absorber by suppressing occurrence of the situation where the vibration damping effect brought by the dynamic damper and the vibration damping effect brought by the centrifugal pendulum vibration absorber cancel each other.

In addition, the third elastic body may be engaged with the output element of the damper mechanism, and the support member of the centrifugal pendulum vibration absorber may be connected to the intermediate element of the damper mechanism. In this way, by connecting the dynamic damper to the output element of the damper mechanism, the mass of the damper mechanism increases as a whole, so the resonance frequency of the damper mechanism decreases. Thus, it is possible to shift the resonance point of the damper mechanism toward a lower rotational speed side so that the resonance point of the damper mechanism is located away from the resonance point of the dynamic damper. Thus, it is possible to further effectively damp vibrations, transmitted from the motor to the input member, with the dynamic damper in a range in which the rotational speed of the front cover (motor) is low. Furthermore, by connecting the centrifugal pendulum vibration absorber to the intermediate element of the damper mechanism, it is possible to further effectively suppress the resonance of the damper mechanism overall by suppressing, using the centrifugal pendulum vibration absorber, vibrations of the intermediate element that is interposed between the first elastic body and the second elastic body and, therefore, vibrates the most among the elements of the damper mechanism. Therefore, it is also possible to suppress the resonance of the dynamic damper, that is, vibrations that occur as vibrations are damped by the dynamic damper. Thus, with the above structure, vibrations transmitted to the input member may be further exceedingly effectively damped by the dynamic damper and the centrifugal pendulum vibration absorber.

Furthermore, the mass body of the dynamic damper may be the turbine runner that is engaged with the third elastic body. Thus, it is possible to structure the dynamic damper while reducing the size of the fluid transmission apparatus overall and suppressing an increase in the number of components.

In addition, the support member of the centrifugal pendulum vibration absorber may be fixed to the intermediate element of the damper mechanism via a coupling member, and the coupling member may be fixed to the intermediate element on the radially outer side of one of the first and second elastic bodies of the damper mechanism, the one of the first and second elastic bodies being arranged on the radially inner side among the first and second elastic bodies. In this way, when the coupling member for fixing the support member of the centrifugal pendulum vibration absorber to the intermediate element of the damper mechanism is fixed to the intermediate element on the radially outer side of one of the first and second elastic bodies of the damper mechanism, the one of the first and second elastic bodies being arranged on the radially inner side among the first and second elastic bodies, a space may be sufficiently ensured on the radially inner side of the centrifugal pendulum vibration absorber, and then, for example, the third elastic body that constitutes the dynamic damper is arranged in the space to thereby make it possible to further reduce the size of the fluid transmission apparatus.

Furthermore, the plurality of mass bodies of the centrifugal pendulum vibration absorber may be respectively supported by support shafts, and the support member of the centrifugal pendulum vibration absorber may have a plurality of guide holes that respectively guide the support shafts such that the mass bodies oscillate with respect to the support member, and the guide holes may be formed in the support member such that, when the coupling member is fixed to the support member of the centrifugal pendulum vibration absorber, the guide holes overlap with a fixing portion of the coupling member, which is fixed to the intermediate element, when viewed in an axial direction of the fluid transmission apparatus. Thus, when the centrifugal pendulum vibration absorber is fixed to the intermediate element of the damper mechanism via the coupling member, the guide holes of the support member of the centrifugal pendulum vibration absorber may be utilized as openings for fixing work. Therefore, it is possible to favorably ensure the stiffness of the support member, and the like, by reducing the number of openings for work that should be formed in the support member, and the like.

In addition, the elastic body of the dynamic damper may be arranged on the radially inner side of the centrifugal pendulum vibration absorber, and the elastic body of the dynamic damper and the centrifugal pendulum vibration absorber may be arranged between the turbine runner and the damper mechanism when viewed in a radial direction of the fluid transmission apparatus. Thus, the third elastic body that constitutes the dynamic damper and the centrifugal pendulum vibration absorber overlap with respect to the axial direction when viewed in the radial direction of the fluid transmission apparatus. Therefore, the axial length of the fluid transmission apparatus is reduced to make it possible to reduce the size of the apparatus overall. Furthermore, by arranging the third elastic body that constitutes the dynamic damper on the radially inner side of the centrifugal pendulum vibration absorber, the arrangement space for the centrifugal pendulum vibration absorber is sufficiently ensured to thereby make it possible to increase the flexibility of selection of the size (radial length) of the mass body of the centrifugal pendulum vibration absorber. Then, by arranging the third elastic body and the centrifugal pendulum vibration absorber between the turbine runner and the damper mechanism when viewed in the radial direction of the fluid transmission apparatus, it is possible to engage the third elastic body with one of the intermediate element and the output element and connect the support member of the centrifugal pendulum vibration absorber to the one or the other of the intermediate element and output element of the damper mechanism while suppressing an increase in the axial length of the fluid transmission apparatus.

DETAILED DESCRIPTION OF THE EMBODIMENTS

Next, a mode for carrying out the present invention will be described with reference to an embodiment.

Figure 1:
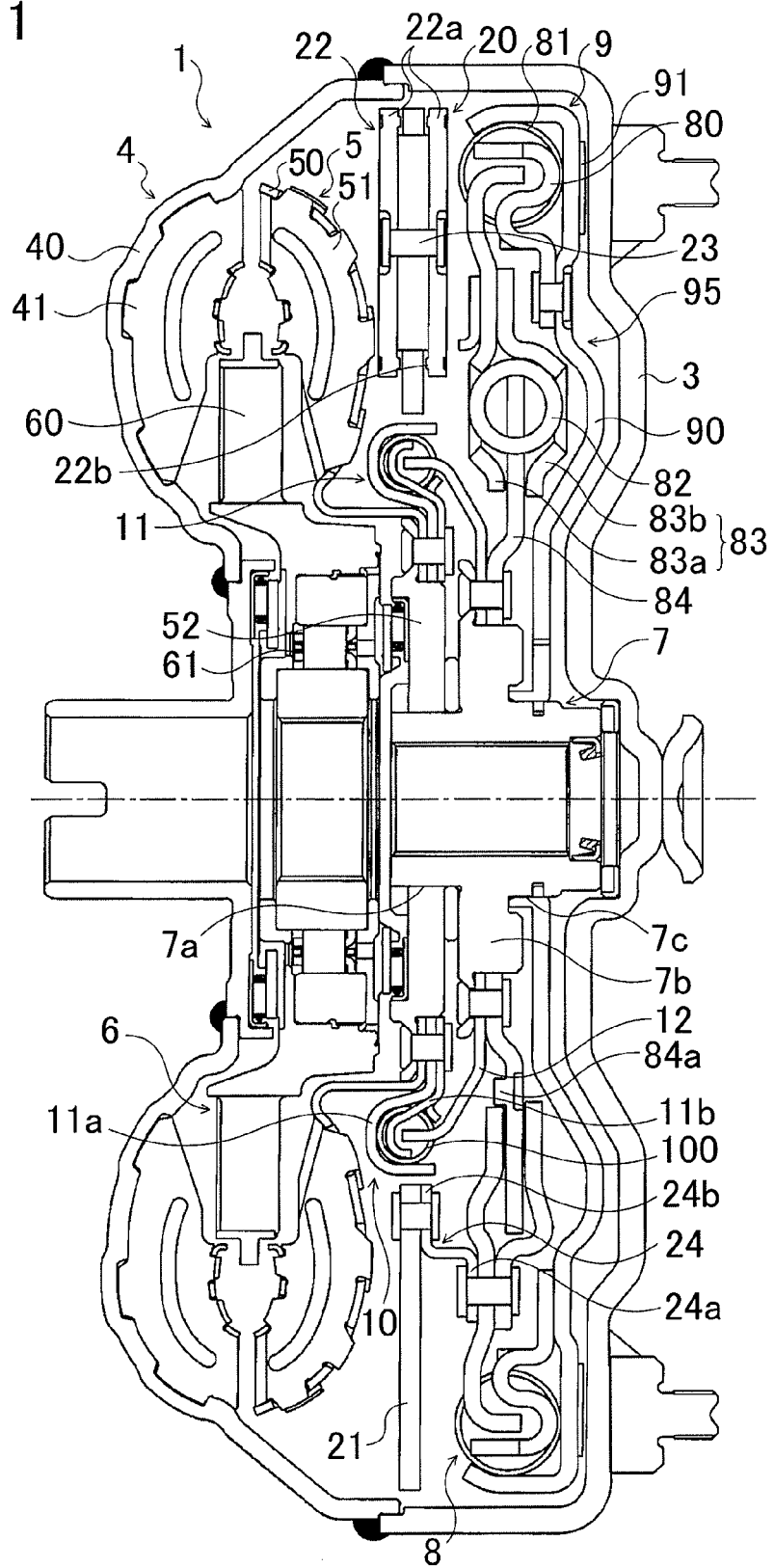
FIG. 1 is a structure diagram that shows a fluid transmission apparatus 1 according to an embodiment of the present invention.

FIG. 1 is a structure diagram that shows a fluid transmission apparatus 1 according to the embodiment of the present invention. The fluid transmission apparatus 1 shown in the drawing is a torque converter that is mounted, as a starting apparatus, on a vehicle equipped with an engine (internal combustion engine) that serves as a motor. The fluid transmission apparatus 1 includes a front cover (input member) 3 that is coupled to a crankshaft of the engine (not shown), a pump impeller (input-side fluid transmitting element) 4 that is fixed to the front cover 3, a turbine runner (output-side fluid transmitting element) 5 that is rotatable coaxially with the pump impeller 4, a stator 6 that rectifies the flow of hydraulic oil (hydraulic fluid) from the turbine runner 5 to the pump impeller 4, a damper hub (output member) 7 that is fixed to an input shaft of a transmission (not shown), which is an automatic transmission (AT) or a continuously variable transmission (CVT), a damper mechanism 8 that is connected to the damper hub 7, and a friction-type single disc lock-up clutch mechanism 9 that has a lock-up piston 90 connected to the damper mechanism 8.

The pump impeller 4 has a pump shell 40 that is airtightly fixed to the front cover 3 and a plurality of pump blades 41 that are arranged on the inner surface of the pump shell 40. The turbine runner 5 has a turbine shell 50 and a plurality of turbine blades 51 that are arranged on the inner surface of the turbine shell 50. The turbine shell 50 is fixed to a turbine hub 52 via rivets. The turbine hub 52 is rotatably fitted to a hub support portion 7a that is formed at the left end (end portion on the transmission side) of the damper hub 7 in the drawing. The pump impeller 4 and the turbine runner 5 face each other. The stator 6 that is rotatable coaxially with the pump impeller 4 and the turbine runner 5 is arranged therebetween. The stator 6 has a plurality of stator blades 60. The rotational direction of the stator 6 is set to only one direction by a one-way clutch 61. These pump impeller 4, turbine runner 5 and stator 6 form a torus (annular flow passage) through which hydraulic oil circulates.

The damper mechanism 8 includes a drive member 80 that serves as an input element, an intermediate member (intermediate element) 83 that is engaged with the drive member 80 via a plurality of first coil springs (first elastic bodies) 81 and a driven plate (output element) 84 that is engaged with the intermediate member 83 via a plurality of second coil springs (second elastic bodies) 82 arranged so as to be spaced apart from the first coil springs 81 in the radial direction of the fluid transmission apparatus 1. The drive member 80 is fixed to the lock-up piston 90 of the lock-up clutch mechanism 9 via rivets, and is arranged in the outer peripheral side region of a housing inner space defined by the front cover 3 and the pump shell 40 of the pump impeller 4. Furthermore, the drive member 80 has a plurality of spring contact portions that are respectively in contact with one ends of the corresponding first coil springs 81. The plurality of first coil springs 81 are slidably held at predetermined intervals in the circumferential direction by the outer peripheral portion of the lock-up piston 90 and the support portions formed in the drive member 80. In addition, the plurality of second coil springs 82 each have a stiffness (spring constant) higher than that of each first coil spring 81, and are slidably held at predetermined intervals in the circumferential direction by the intermediate member 83 on the radially inner side of the first coil springs 81.

The intermediate member 83 of the damper mechanism 8 is formed of an annular first intermediate plate 83a and an annular second intermediate plate 83b that is fixed to the first intermediate plate 83a via rivets. The first intermediate plate 83a has a plurality of first spring contact portions at its outer peripheral side. The plurality of first spring contact portions are respectively in contact with the other ends of the corresponding first coil springs 81. The first intermediate plate 83a has a plurality of second spring support portions at its inner peripheral side for the purpose of holding the second coil springs 82. The second intermediate plate 83b has second spring support portions that respectively face the second spring support portions of the first intermediate plate 83a to hold the second coil springs 82. Then, at least one of the first and second intermediate plates 83a and 83b has a plurality of spring contact portions that are respectively in contact with one ends of the corresponding second coil springs 82. The driven plate 84 is arranged between the first intermediate plate 83a and the second intermediate plate 83b, and is fixed to the damper hub 7. In the embodiment, the driven plate 84 is fixed to a plate fixing portion 7b via rivets. The plate fixing portion 7b extends from a center portion (right side of the hub support portion 7a in the drawing) of the damper hub 7 with respect to the axial direction outward in the radial direction of the fluid transmission apparatus 1. In addition, the driven plate 84 has an aligning portion 84a that is in contact with the inner periphery of the first intermediate plate 83a to align the intermediate member 83.

The lock-up clutch mechanism 9 is able to carry out lockup where the front cover 3 is coupled to the damper hub 7 via the damper mechanism 8, and is able to cancel the lockup. In the embodiment, as shown in FIG. 1, the lock-up piston 90 of the lock-up clutch mechanism 9 is arranged inside the front cover 3 and near the inner wall surface of the front cover 3 on the engine side (right side in the drawing), and is fitted to a piston support portion 7c so as to be slidable in the axial direction and rotatable with respect to the piston support portion 7c. The piston support portion 7c is formed in the damper hub 7 (right end in the drawing) so as to be located on the opposite side of the plate fixing portion 7b from the hub support portion 7a. In addition, a friction material 91 is stuck to the outer peripheral side surface of the lock-up piston 90 on the front cover 3-side. Then, a lock-up chamber 95 is defined between the back surface (right side surface in the drawing) of the lock-up piston 90 and the front cover 3. The lock-up chamber 95 is connected to a hydraulic control unit (not shown) via a hydraulic oil supply hole (not shown) and an oil passage (not shown) that is formed in the input shaft.

When power is transmitted between the pump impeller 4 and the turbine runner 5 without carrying out lockup by the lock-up clutch mechanism 9, hydraulic oil supplied to the pump impeller 4 and the turbine runner 5 flows into the lock-up chamber 95, and the lock-up chamber 95 is filled with the hydraulic oil. Thus, at this time, the lock-up piston 90 is not moved toward the front cover 3, so the lock-up piston 90 is not frictionally engaged with the front cover 3. In addition, when the pressure inside the lock-up chamber 95 is reduced by the hydraulic control unit (not shown), the lock-up piston 90 is moved toward the front cover 3 due to the pressure difference to thereby be frictionally engaged with the front cover 3. Thus, the front cover 3 is coupled to the damper hub 7 via the damper mechanism 8, and, accordingly, power from the engine is transmitted to the input shaft of the transmission via the front cover 3, the damper mechanism 8 and the damper hub 7. Note that, when reducing the pressure inside the lock-up chamber 95 is stopped, the lock-up piston 90 separates from the front cover 3 due to reduction in pressure difference resulting from the flow of hydraulic oil into the lock-up chamber 95. Thus, lockup is cancelled.

Here, in the above fluid transmission apparatus 1, when lockup is carried out at the time when the rotational speed of the engine coupled to the front cover 3 has reached an extremely low lock-up rotational speed Nlup, that is, for example, about 1000 rpm, power transmission efficiency between the engine and the transmission is improved to thereby make it possible to further improve the fuel economy of the engine. Therefore, in order to favorably damp vibrations generated in a path from the front cover (input member) 3 to the damper hub (output member) 7 when the rotational speed of the front cover 3 (engine rotational speed) is around an extremely low predetermined lock-up rotational speed Nlup, the fluid transmission apparatus 1 according to the embodiment includes a dynamic damper 10 and a centrifugal pendulum vibration absorber 20. The dynamic damper 10 is formed of the turbine runner 5, which serves as a mass body, and a plurality of coil springs (third elastic bodies) 100.

As shown in FIG. 1, the plurality of coil springs 100 that constitute the dynamic damper 10 are slidably held at predetermined intervals in the circumferential direction by a spring support member 11, which is fixed to the turbine hub 52 via rivets together with the turbine shell 50, and are arranged in an inner peripheral side region between the turbine runner 5 and the damper mechanism 8 when viewed in the radial direction of the fluid transmission apparatus 1. The spring support member 11 is formed of a first member 11a and a second member 11b. The first member 11a supports the side portions, on the turbine runner 5-side, and outer peripheral portions of the coil springs 100. The second member 11b supports the inner peripheral side portions of the side portions, on the damper mechanism 8-side, of the coil springs 100, and has a plurality of spring contact portions that are respectively in contact with one ends of the corresponding coil springs 100. In addition, an engaging member 12 is fixed to the above-described damper hub 7 via rivets together with the driven plate 84 of the damper mechanism 8, and the engaging member 12 has a plurality of contact portions each extending outward toward the turbine runner 5. Then, the other ends of the coil springs 100, held by the spring support member 11, are in contact with the corresponding contact portions of the engaging member 12. That is, in the embodiment, the plurality of coil springs 100 that constitute the dynamic damper 10 each are engaged with the driven plate 84 of the damper mechanism 8 and the damper hub 7.

Figure 2:
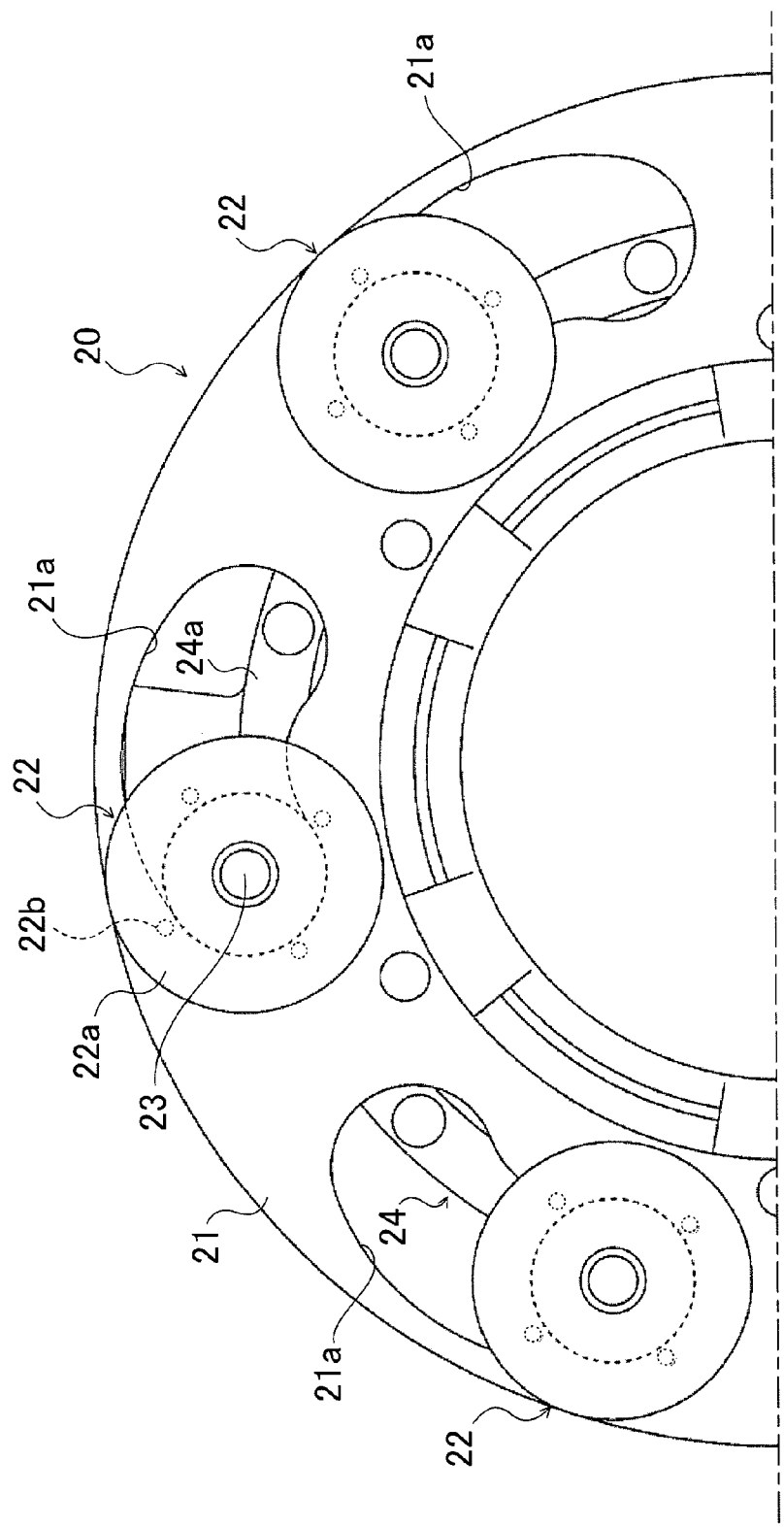
FIG. 2 is a structure diagram that shows a centrifugal pendulum vibration absorber 20 of the fluid transmission apparatus 1.
Figure 3:
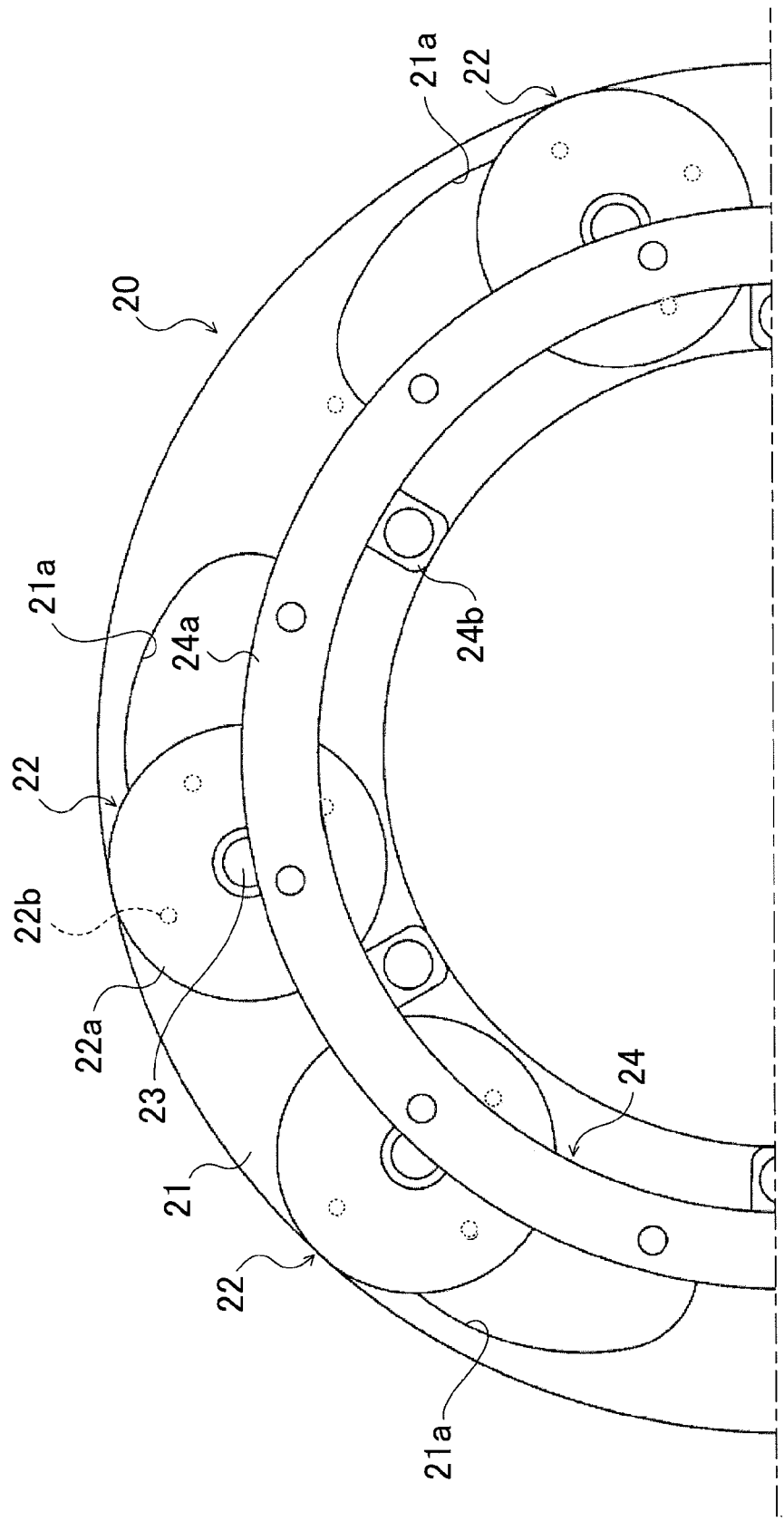
FIG. 3 is a structure diagram that shows the centrifugal pendulum vibration absorber 20 of the fluid transmission apparatus 1.

As shown in FIG. 1 to FIG. 3, the centrifugal pendulum vibration absorber 20 includes an annular support member 21 that is coupled to the damper mechanism 8 and a plurality of mass bodies 22 that are oscillatable with respect to the support member 21. The support member 21 according to the embodiment has a plurality of guide holes 21a, which are arc-shaped oblong holes, at equiangular intervals as shown in FIG. 2 and FIG. 3. In addition, each of the mass bodies 22 according to the embodiment is formed of two disc-shaped metal plates 22a and a support shaft 23. The support shaft 23 is rollably inserted in the guide hole 21a of the support member 21, and the metal plates 22a are fixed to both ends of the support shaft 23. Furthermore, a plurality of (four in the embodiment) minute protrusions 22b are formed on the surface of each metal plate 22a, facing the support member 21, so as to extend toward the support member 21 in order to suppress a slide between the surface overall and the support member 21.

Then, the centrifugal pendulum vibration absorber 20 according to the embodiment is fixed to the intermediate member 83 of the damper mechanism 8 via a coupling member 24, and is arranged on the radially outer side of the coil springs 100 that constitute the dynamic damper 10. The coupling member 24 has an annular ring portion 24a and a plurality of protruding pieces 24b. The plurality of protruding pieces 24b each extend from the inner peripheral portion of the annular ring portion 24a in the axial direction and further radially inward, and each have a substantially L-shaped cross section. As shown in FIG. 1 and FIG. 3, each protruding piece 24b of the coupling member 24 is fixed to the inner peripheral portion of the support member 21 via a rivet between the mutually adjacent guide holes 21a. Furthermore, as is apparent from FIG. 1, the annular ring portion 24a of the coupling member 24 is fixed to the intermediate member 83 (first and second intermediate plates 83a and 83b) via rivets on the radially outer side of the second coil springs 82 of the damper mechanism 8. In this way, when the coupling member 24 is fixed to the intermediate member 83 on the radially outer side of the second coil springs 82 that are arranged on the radially inner side among the first and second coil springs 81 and 82 of the damper mechanism 8, a space is sufficiently ensured on the radially inner side of the centrifugal pendulum vibration absorber 20, and then the coil springs 100 of the dynamic damper 10 are arranged in the space to thereby make it possible to reduce the size of the fluid transmission apparatus 1.

In addition, in the embodiment, the support member 21 and the coupling member 24 are formed such that, when the centrifugal pendulum vibration absorber 20 in which the coupling member 24 is fixed to the support member 21 is positioned with respect to the intermediate member 83 of the damper mechanism 8, the guide holes 21a of the support member 21 and the rivet holes of the annular ring portion 24a radially overlap when viewed in the axial direction of the fluid transmission apparatus 1. That is, as shown in FIG. 2, the guide holes 21a are formed in the support member 21 such that, when the coupling member 24 is fixed to the support member 21 of the centrifugal pendulum vibration absorber 20, the guide holes 21a overlap with the fixing portions of the coupling member 24, which are fixed to the intermediate member 83, when viewed in the axial direction of the fluid transmission apparatus 1. Thus, when the centrifugal pendulum vibration absorber 20 is fixed to the intermediate member 83 of the damper mechanism 8 via the coupling member 24, the guide holes 21a of the support member 21 of the centrifugal pendulum vibration absorber 20 may be utilized as openings for work for crimping the rivets if the mass bodies 22 are moved as appropriate. Therefore, it is possible to favorably ensure the stiffness of the support member 21, and the like, by reducing the number of openings for work that should be formed in the support member 21, and the like.

As described above, the plurality of coil springs 100 that constitute the dynamic damper 10 according to the embodiment are arranged on the radially inner side of the centrifugal pendulum vibration absorber 20, and are arranged together with the centrifugal pendulum vibration absorber 20 between the turbine runner 5 and the damper mechanism 8 when viewed in the radial direction of the fluid transmission apparatus 1. Thus, the coil springs 100 of the dynamic damper 10 and the centrifugal pendulum vibration absorber 20 overlap with respect to the axial direction when viewed in the radial direction of the fluid transmission apparatus 1, so the axial length of the fluid transmission apparatus 1 is reduced to make it possible to reduce the size of the apparatus overall. In addition, by arranging the coil springs 100 of the dynamic damper 10 on the radially inner side of the centrifugal pendulum vibration absorber 20, the arrangement space for the centrifugal pendulum vibration absorber 20 on the radially outer side is sufficiently ensured to thereby make it possible to increase the flexibility of selection of the size, particularly, the radial length, of each mass body 22 of the centrifugal pendulum vibration absorber 20. Furthermore, by arranging the coil springs 100 of the dynamic damper 10 and the centrifugal pendulum vibration absorber 20 between the turbine runner 5 and the damper mechanism 8 when viewed in the radial direction of the fluid transmission apparatus 1, it is possible to engage the coil springs 100 of the dynamic damper 10 with the driven plate 84 of the damper mechanism 8 and connect the support member 21 of the centrifugal pendulum vibration absorber 20 to the intermediate member 83 of the damper mechanism 8 while suppressing an increase in the axial length of the fluid transmission apparatus 1.

Next, the operation of the above-described fluid transmission apparatus 1 will be described with reference to FIG. 4.

Figure 4:
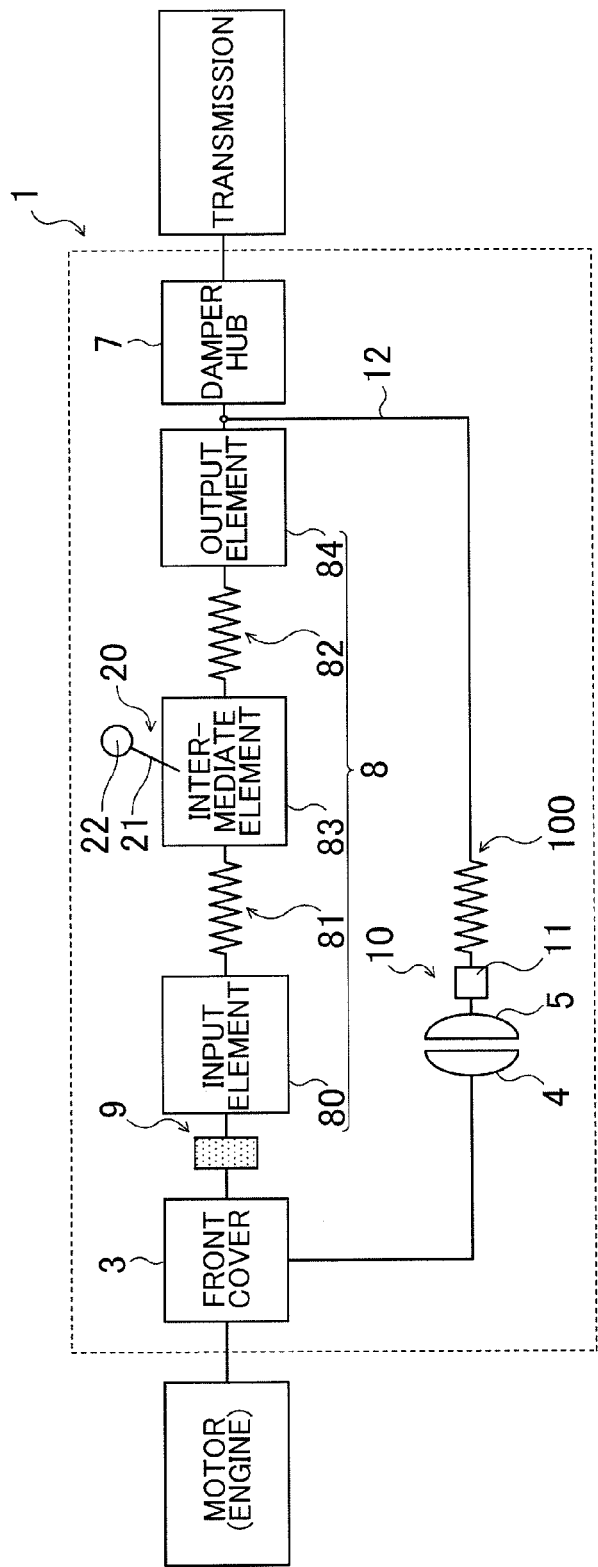
FIG. 4 is a schematic block diagram of the fluid transmission apparatus 1.

As is apparent from FIG. 4, during lockup cancellation where the front cover 3 is not coupled to the damper hub 7 via the damper mechanism 8 by the lock-up clutch mechanism 9, power from the engine that serves as a motor is transmitted to the input shaft of the transmission via a path formed of the front cover 3, the pump impeller 4, the turbine runner 5, the plurality of coil springs 100, the engaging member 12 and the damper hub 7.

On the other hand, during lockup where the front cover 3 is coupled to the damper hub 7 via the damper mechanism 8 by the lock-up clutch mechanism 9, as is apparent from FIG. 4, power from the engine that serves as a motor is transmitted to the input shaft of the transmission via a path formed of the front cover 3, the lock-up clutch mechanism 9, the drive member 80, the first coil springs 81, the intermediate member 83, the second coil springs 82, the driven plate 84 and the damper hub 7. At this time, fluctuations in torque input in the front cover 3 are mainly absorbed by the first and second coil springs 81 and 82 of the damper mechanism 8.

In addition to the above damper mechanism 8, during lockup, the plurality of coil springs 100 that are engaged with the turbine runner 5 and the driven plate 84 of the damper mechanism 8 constitute the dynamic damper 10 together with the turbine runner 5, the spring support member 11, and the like, that serve as masses that do not contribute to torque transmission between the front cover 3 (input member) and the damper hub (output member) 7, and it is possible to effectively absorb (damp) vibrations, transmitted from the engine side to the front cover 3, from the driven plate 84 of the damper mechanism 8 with the dynamic damper 10. Furthermore, in the fluid transmission apparatus 1 according to the embodiment, as the damper mechanism 8 coupled to the front cover 3 by the lock-up piston 90 in accordance with lockup rotates together with the front cover 3, the support member 21 coupled to the intermediate member 83 of the damper mechanism 8 also rotates about the axis of the fluid transmission apparatus 1 together with the intermediate member 83. With the rotation of the support member 21, the support shafts 23 of the mass bodies 22 that constitute the centrifugal pendulum vibration absorber 20 are guided by the respective guide holes 21a of the support member 21 to roll between one ends and the other ends of the corresponding guide holes 21a. Thus, the mass bodies 22 each oscillate with respect to the support member 21. Thus, vibrations opposite in phase to vibrations (resonance) of the intermediate member 83 are applied from the centrifugal pendulum vibration absorber 20 to the intermediate member 83 to thereby make it possible to absorb (damp) vibrations transmitted to the front cover 3 with the centrifugal pendulum vibration absorber 20 as well.

Thus, in the fluid transmission apparatus 1 according to the embodiment, by adjusting the stiffness (spring constant) of each coil spring 100, the weight (inertia) of the turbine runner 5, and the like, which define the vibration damping characteristic (resonance frequency) of the dynamic damper 10, the size (particularly, the radial length) and weight of each mass body 22, the shape and dimensions of each guide hole 21a, and the like, which define the vibration damping characteristic of the centrifugal pendulum vibration absorber 20, on the basis of the number of cylinders of the engine that serves as a motor and the lock-up rotational speed Nlup at which lockup is carried out, even if lockup is carried out when the rotational speed of the engine is extremely low like, for example, 1000 rpm, vibrations transmitted from the engine that serves as a motor to the fluid transmission apparatus 1, that is, the front cover 3, are effectively absorbed (damped) by the dynamic damper 10 and the centrifugal pendulum vibration absorber 20 to thereby make it possible to favorably suppress transmission of the vibrations to the damper hub 7 via the driven plate 84. Then, with the fluid transmission apparatus 1, it is possible to improve the power transmission efficiency and, consequently, it is possible to improve the fuel economy of the engine, by carrying out lockup at the time when the rotational speed of the engine has reached the lock-up rotational speed Nlup that is relatively low like, for example, about 1000 rpm.

Figure 5:
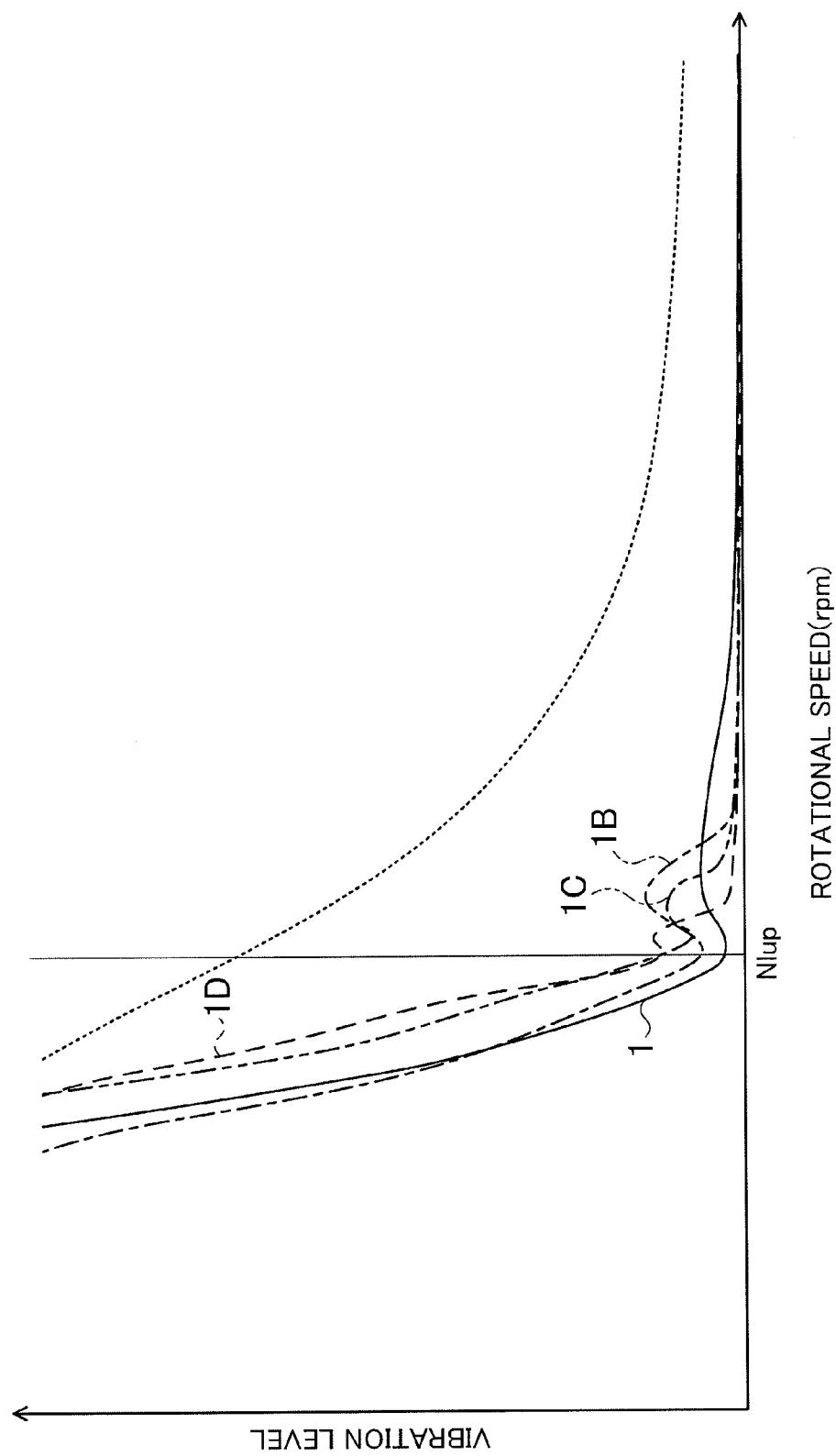
FIG. 5 is an explanatory graph that illustrates the correlation between the rotational speed of an engine, which serves as a motor, and the vibration level of each fluid transmission apparatus.

FIG. 5 is an explanatory graph that illustrates the correlation between the rotational speed of the engine, which serves as a motor, and the vibration level of the above-described fluid transmission apparatus 1, and the like. The graph illustrates the correlation between the rotational speed of the engine (front cover 3) and the vibration level in a path of each fluid transmission apparatus from the front cover 3 to the damper hub 7 in a plurality of fluid transmission apparatuses. The correlation was obtained through simulations of a torsional vibration system, conducted in order to obtain a fluid transmission apparatus suitable for combination with cylinder-saving (few-cylinder) engines, such as a three-cylinder engine or a four-cylinder engine, that generate relatively large vibrations. In the above simulations, the specifications of the engine that serves as a motor and the specifications of the pump impeller 4, turbine runner 5, damper mechanism 8 and lock-up clutch mechanism 9 were basically the same, the mass (inertia) of the turbine runner 5, and the like, and the stiffness of each coil spring 100, the turbine runner 5 and each coil spring 100 constituting the dynamic damper 10, and the sizes and weights of the support member 21 and each mass body 22 of the centrifugal pendulum vibration absorber 20 were also basically the same.

Here, during lockup of the lock-up clutch mechanism 9, vibrations input from the engine to the front cover 3 are transmitted to the input element (drive member 80) of the damper mechanism 8 with almost no damping, so, when a cylinder-saving engine is set as an object, even if at least any one of the dynamic damper 10 and the centrifugal pendulum vibration absorber 20 is connected to the input element (drive member 80) of the damper mechanism 8, there is a concern that a sufficient vibration damping effect brought by the dynamic damper 10 and the centrifugal pendulum vibration absorber 20 may not be obtained. Therefore, here, the above simulations were conducted on the condition that the intermediate member (intermediate element) 83 and driven plate (output element) 84 of the damper mechanism 8 are set as objects to which the dynamic damper 10 and the centrifugal pendulum vibration absorber 20 are coupled.

Figure 6:
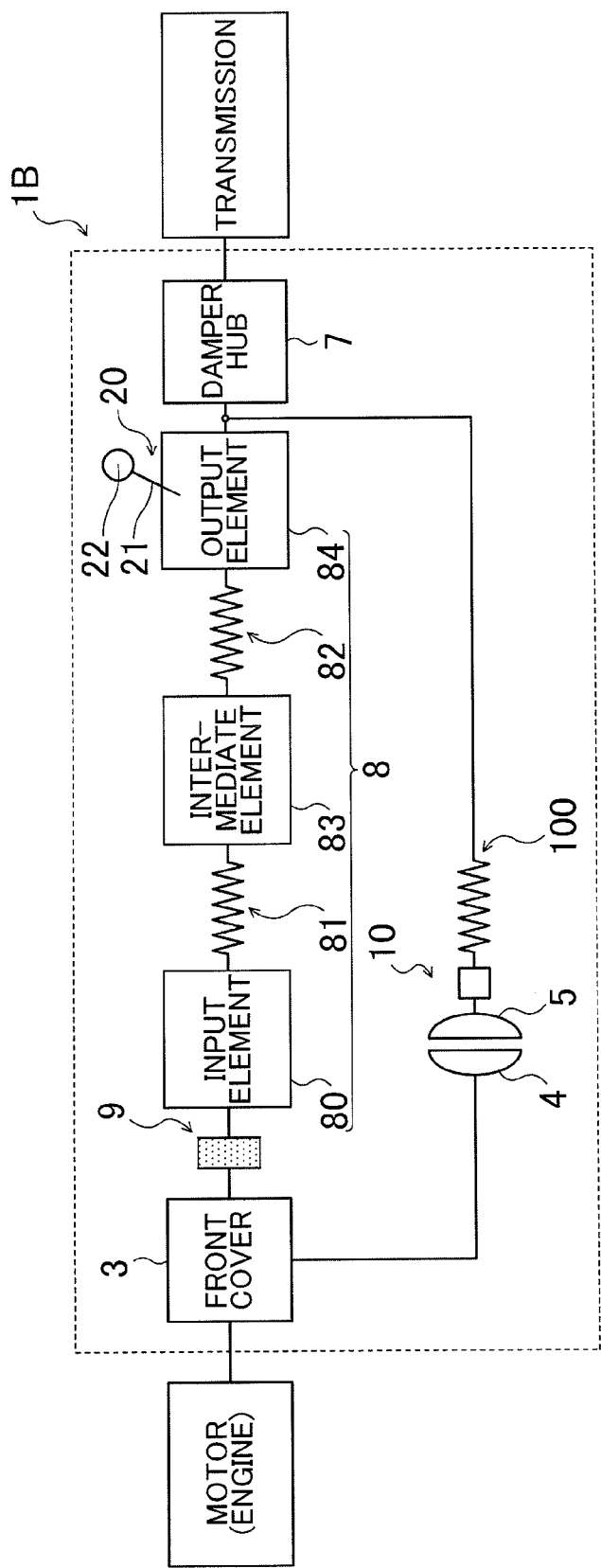
FIG. 6 is a schematic block diagram that shows a fluid transmission apparatus 1B according to an alternative embodiment.
Figure 7:
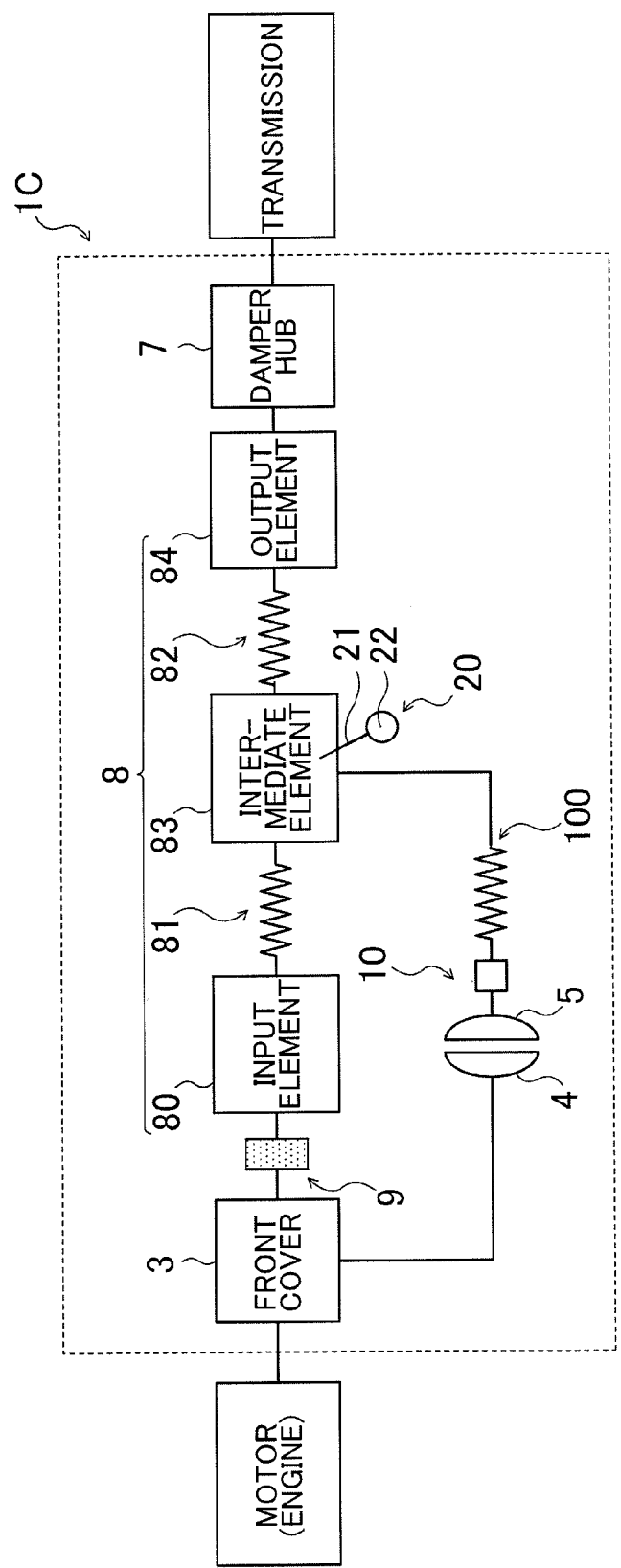
FIG. 7 is a schematic block diagram that shows a fluid transmission apparatus 1C according to another alternative embodiment.
Figure 8:
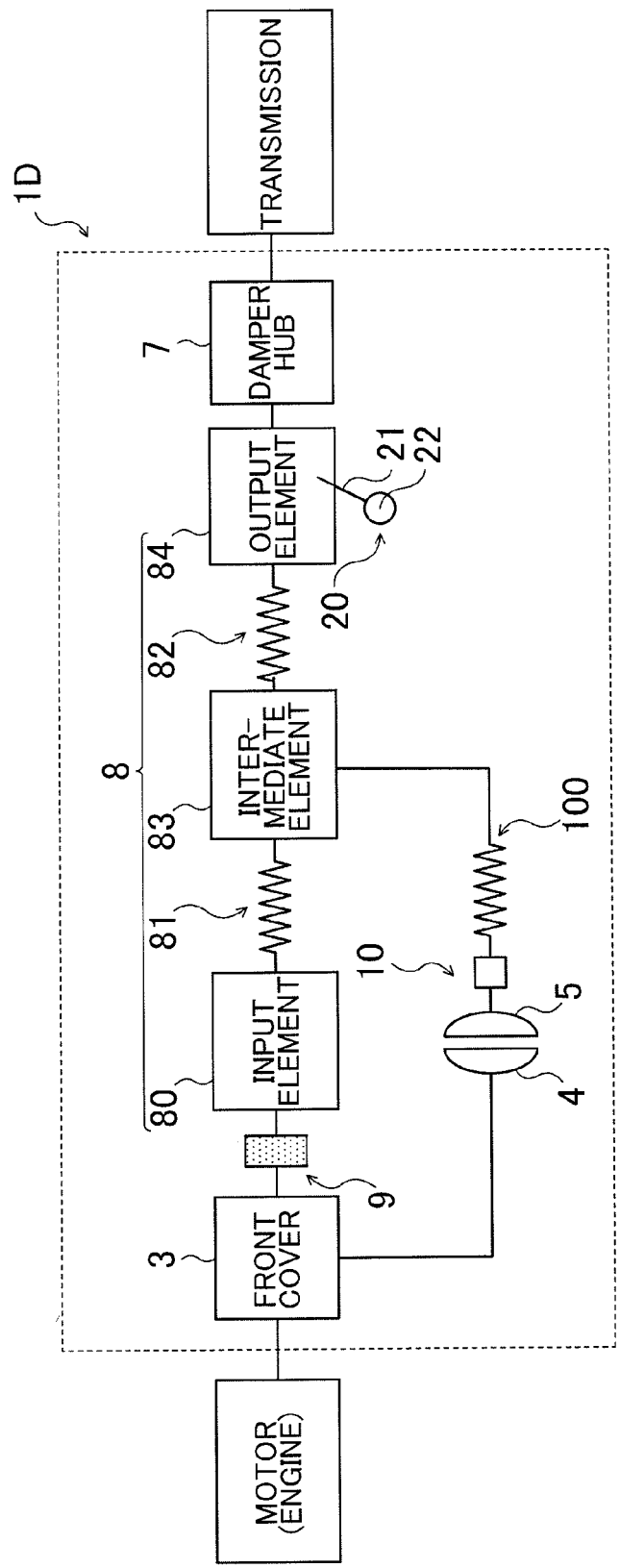
FIG. 8 is a schematic block diagram that shows a fluid transmission apparatus 1D according to yet another alternative embodiment.

In FIG. 5, the solid line indicates the vibration level of the fluid transmission apparatus 1 according to the above embodiment. In addition, in FIG. 5, the alternate long and short dash line indicates the vibration level of a fluid transmission apparatus 1B where, as shown in FIG. 6, the coil springs 100 of the dynamic damper 10 are engaged with the driven plate 84 of the damper mechanism 8 (and the damper hub 7) and the support member 21 of the centrifugal pendulum vibration absorber 20 is connected to the driven plate 84 of the damper mechanism 8 (and the damper hub 7). Furthermore, in FIG. 5, the alternate long and two short dashes line indicates the vibration level of a fluid transmission apparatus 1C where, as shown in FIG. 7, the coil springs 100 of the dynamic damper 10 are engaged with the intermediate member (intermediate element) 83 of the damper mechanism 8 and the support member 21 of the centrifugal pendulum vibration absorber 20 is connected to the intermediate member 83 of the damper mechanism 8. In addition, in FIG. 5, the broken line indicates the vibration level of a fluid transmission apparatus 1D where, as shown in FIG. 8, the coil springs 100 of the dynamic damper 10 are engaged with the intermediate member (intermediate element) 83 of the damper mechanism 8 and the support member 21 of the centrifugal pendulum vibration absorber 20 is connected to the driven plate 84 of the damper mechanism 8 (and the damper hub 7).

Furthermore, in FIG. 5, the dotted line indicates the vibration level of a fluid transmission apparatus obtained by omitting the dynamic damper 10 and the centrifugal pendulum vibration absorber 20 from the fluid transmission apparatus 1 according to the above embodiment.

As is apparent from FIG. 5, in the fluid transmission apparatuses 1 and 1B in which the dynamic damper 10 is connected to the driven plate 84, which is the output element of the damper mechanism 8, (and the damper hub 7), the mass of the damper mechanism 8 increases as a whole, so the resonance frequency of the damper mechanism 8 decreases and, as a result, the resonance point of the damper mechanism 8 shifts toward a lower rotational speed side as compared with the other fluid transmission apparatuses. Thus, in the fluid transmission apparatuses 1 and 1B, the resonance point of the dynamic damper 10 may be shifted away from the resonance point of the damper mechanism 8. Thus, it is possible to further effectively damp vibrations transmitted from the engine to the front cover 3 with the dynamic damper 10 in a range in which the rotational speed of the engine (front cover) is low, that is, around the lock-up rotational speed Nlup determined at a lower value in terms of efficiency.

In addition, when the fluid transmission apparatus 1 is compared with the fluid transmission apparatus 1B, in the fluid transmission apparatus 1 in which the centrifugal pendulum vibration absorber 20 is connected to the intermediate member 83 of the damper mechanism 8, it is possible to effectively suppress the resonance of the damper mechanism 8 overall by suppressing, using the centrifugal pendulum vibration absorber 20, vibrations of the intermediate member 83 that is interposed between the first coil springs 81 and the second coil springs 82 and, therefore, vibrates the most among the elements of the damper mechanism 8. As indicated by the solid line in FIG. 5, it is possible to also suppress the resonance of the dynamic damper 10, that is, vibrations (the peak of waveform after vibrations are damped) that occur as vibrations are damped by the dynamic damper 10, by the amount by which the resonance of the damper mechanism 8 overall is suppressed. In contrast to this, in the fluid transmission apparatus 1B in which the centrifugal pendulum vibration absorber 20 is connected to the driven plate 84 of the damper mechanism 8, the resonance of the dynamic damper 10, that is, vibrations that occur as vibrations are damped by the dynamic damper 10, slightly increase by the amount by which the level of suppression of the resonance of the damper mechanism 8 overall is lower than that of the fluid transmission apparatus 1; however, the resonance of the dynamic damper 10 may be further quickly converged by the centrifugal pendulum vibration absorber 20. Therefore, it is possible to more quickly converge vibrations of the system overall in a path from the front cover 3 to the damper hub 7, that is, formed of the damper mechanism 8, the dynamic damper 10 and the centrifugal pendulum vibration absorber 20, as compared with the fluid transmission apparatus 1.

Furthermore, in the fluid transmission apparatuses 1C and 1D in which the dynamic damper 10 is connected to the intermediate member 83 of the damper mechanism 8, the resonance level of the damper mechanism 8 overall is high as compared with the fluid transmission apparatuses 1 and 1B in which the centrifugal pendulum vibration absorber 20 is connected to the intermediate member 83 of the damper mechanism 8; however, the resonance point of the dynamic damper 10 shifts toward a lower rotational speed side by connecting the dynamic damper 10 to the intermediate member 83 of the damper mechanism 8. Therefore, it is possible to more quickly converge vibrations of the system overall in a path from the front cover 3 to the damper hub 7, that is, formed of the damper mechanism 8, the dynamic damper 10 and the centrifugal pendulum vibration absorber 20.

In addition, when the fluid transmission apparatus 1C is compared with the fluid transmission apparatus 1D, in the fluid transmission apparatus 1C in which the centrifugal pendulum vibration absorber 20 is connected to the intermediate member 83 of the damper mechanism 8, it is possible to further effectively suppress the resonance of the damper mechanism 8 overall by suppressing, using the centrifugal pendulum vibration absorber 20, vibrations of the intermediate member 83 that is interposed between the first coil springs 81 and the second coil springs 82 and, therefore, vibrates the most among the elements of the damper mechanism 8. As indicated by the alternate long and two short dashes line in FIG. 5, it is possible to also suppress the resonance of the dynamic damper 10, that is, vibrations (the peak of waveform after vibrations are damped) that occur as vibrations are damped by the dynamic damper 10, by the amount by which the resonance of the damper mechanism 8 overall is suppressed. In contrast to this, in the fluid transmission apparatus 1D in which the centrifugal pendulum vibration absorber 20 is connected to the driven plate 84 of the damper mechanism 8, the resonance of the dynamic damper 10, that is, vibrations that occur as vibrations are damped by the dynamic damper, slightly increase by the amount by which the level of suppression of the resonance of the damper mechanism 8 overall is lower than that of the fluid transmission apparatus 1C; however, the resonance of the dynamic damper 10 may be further quickly converged by the centrifugal pendulum vibration absorber 20. Therefore, it is possible to more quickly converge vibrations of the system overall in a path from the front cover 3 to the damper hub 7, that is, formed of the damper mechanism 8, the dynamic damper 10 and the centrifugal pendulum vibration absorber 20, as compared with the fluid transmission apparatus 1C.

As described above, in the fluid transmission apparatus 1 according to the embodiment, in order to further effectively damp vibrations transmitted from the engine to the front cover 3 around the lock-up rotational speed Nlup, which is determined at a lower value in terms of efficiency, in consideration of the results of the simulations shown in FIG. 5, the coil springs 100 that constitute the dynamic damper 10 are engaged with the driven plate 84 of the damper mechanism 8 (and the damper hub 7), and the support member 21 of the centrifugal pendulum vibration absorber 20 is connected to the intermediate member 83 of the damper mechanism 8. In this way, by connecting the dynamic damper 10 to the driven plate 84 of the damper mechanism 8, the mass of the damper mechanism 8 increases as a whole, so the resonance frequency of the damper mechanism 8 decreases. Thus, it is possible to shift the resonance point of the damper mechanism 8 toward a lower rotational speed side so that the resonance point of the damper mechanism 8 is located away from the resonance point of the dynamic damper 10. Thus, it is possible to further effectively damp vibrations, transmitted from the engine to the front cover 3, with the dynamic damper 10 in a range in which the rotational speed of the engine (front cover 3) is low. Furthermore, by connecting the centrifugal pendulum vibration absorber 20 to the intermediate member 83 of the damper mechanism 8, it is possible to further effectively suppress the resonance of the damper mechanism 8 overall by suppressing, using the centrifugal pendulum vibration absorber 20, vibrations of the intermediate member 83 that is interposed between the first coil springs 81 and the second coil springs 82 and, therefore, vibrates the most among the elements of the damper mechanism 8. Therefore, it is also possible to suppress the resonance of the dynamic damper 10, that is, vibrations that occur as vibrations are damped by the dynamic damper 10. Thus, in the fluid transmission apparatus 1 according to the embodiment, vibrations transmitted to the front cover 3 may be further exceedingly effectively damped by the dynamic damper 10 and the centrifugal pendulum vibration absorber 20.

However, as is apparent from FIG. 5, with the fluid transmission apparatuses 1B, 1C and 1D shown in FIG. 6 to FIG. 8 as well, the dynamic damper 10 and the centrifugal pendulum vibration absorber 20 are connected to the damper mechanism 8 independently (parallel), so it is possible to further effectively damp vibrations, transmitted to the front cover 3, with the dynamic damper 10 and the centrifugal pendulum vibration absorber 20 by suppressing occurrence of the situation where the vibration damping effect brought by the dynamic damper 10 and the vibration damping effect brought by the centrifugal pendulum vibration absorber 20 cancel each other. That is, when the dynamic damper 10 is connected to one of the intermediate member 83 and driven plate 84 of the damper mechanism 8 and the centrifugal pendulum vibration absorber 20 is connected to the one of the intermediate member 83 and the driven plate 84 or when the dynamic damper 10 is connected to one of the intermediate member 83 and driven plate 84 of the damper mechanism 8 and the centrifugal pendulum vibration absorber 20 is connected to the other of the intermediate member 83 and driven plate 84 of the damper mechanism 8, it is possible to obtain a fluid transmission apparatus suitable for combination with a cylinder-saving engine.

In addition, as in the case of the embodiment, by engaging the turbine runner 5 that serves as a mass body with the coil springs 100, it is possible to structure the dynamic damper 10 while reducing the size of the fluid transmission apparatus 1 overall and suppressing an increase in the number of components. However, of course, the present invention may be applied to a fluid transmission apparatus that includes a dynamic damper that uses a member, other than the turbine runner 5, as a mass body.

Furthermore, the support member 21 of the centrifugal pendulum vibration absorber 20 according to the embodiment is fixed to the intermediate member 83 of the damper mechanism 8 via the coupling member 24, and the coupling member 24 is fixed to the intermediate member 83 on the radially outer side of the second coil springs 82 that are arranged on the radially inner side among the first and second coil springs 81 and 82 of the damper mechanism 8. Thus, it is possible to sufficiently ensure a space on the radially inner side of the centrifugal pendulum vibration absorber 20, and then the coil springs 100 of the dynamic damper 10 are arranged in the space to thereby make it possible to reduce the size of the fluid transmission apparatus 1.

In addition, the plurality of mass bodies 22 of the centrifugal pendulum vibration absorber 20 according to the embodiment are respectively supported by the support shafts 23, and the support member 21 of the centrifugal pendulum vibration absorber 20 has the plurality of guide holes 21a that respectively guide the support shafts 23 such that the mass bodies 22 oscillate with respect to the support members 21. Then, the guide holes 21a are formed in the support member 21 such that, when the coupling member 24 is fixed to the support member 21 of the centrifugal pendulum vibration absorber 20, the guide holes 21a overlap with the fixing portions (rivet holes) of the coupling member 24, which are fixed to the intermediate member 83, when viewed in the axial direction of the fluid transmission apparatus 1. Thus, when the centrifugal pendulum vibration absorber 20 is fixed to the intermediate member 83 of the damper mechanism 8 via the coupling member 24, the guide holes 21a of the support member 21 of the centrifugal pendulum vibration absorber 20 may be utilized as openings for fixing work. Therefore, it is possible to favorably ensure the stiffness of the support member 21, and the like, by reducing the number of openings for work that should be formed in the support member 21, and the like.

Furthermore, the coil springs 100 of the dynamic damper 10 according to the embodiment are arranged on the radially inner side of the centrifugal pendulum vibration absorber 20, and the coil springs 100 of the dynamic damper 10 and the centrifugal pendulum vibration absorber 20 are arranged between the turbine runner 5 and the damper mechanism 8 when viewed in the radial direction of the fluid transmission apparatus 1. Thus, the coil springs 100 of the dynamic damper 10 and the centrifugal pendulum vibration absorber 20 overlap with respect to the axial direction when viewed in the radial direction of the fluid transmission apparatus 1. Therefore, the axial length of the fluid transmission apparatus 1 is reduced to make it possible to reduce the size of the apparatus overall. Furthermore, by arranging the coil springs 100 of the dynamic damper 10 on the radially inner side of the centrifugal pendulum vibration absorber 20, the arrangement space for the centrifugal pendulum vibration absorber 20 is sufficiently ensured to thereby make it possible to increase the flexibility of selection of the size, particularly, the radial length, of each mass body 22 of the centrifugal pendulum vibration absorber 20. Then, by arranging the coil springs 100 of the dynamic damper 10 and the centrifugal pendulum vibration absorber 20 between the turbine runner 5 and the damper mechanism 8 when viewed in the radial direction of the fluid transmission apparatus 1, it is possible to engage the coil springs 100 of the dynamic damper 10 with the driven plate 84 of the damper mechanism 8 and connect the support member 21 of the centrifugal pendulum vibration absorber 20 to the intermediate member 83 of the damper mechanism 8 while suppressing an increase in the axial length of the fluid transmission apparatus 1.

Note that the above-described fluid transmission apparatuses 1, 1B, 1C and 1D each are structured as a torque converter that includes the pump impeller 4, the turbine runner 5 and the stator 6; instead, the fluid transmission apparatus according to the present invention may be structured as a fluid coupling that includes no stator. In addition, the above-described fluid transmission apparatuses 1, 1B, 1C and 1D may include a friction-type multiple disc lock-up clutch mechanism instead of the friction-type single disc lock-up clutch mechanism 9. Furthermore, the structure of the centrifugal pendulum vibration absorber in the present invention is not limited to the structure of the above-described centrifugal pendulum vibration absorber 20.

Here, the correlation between major elements of the above embodiment, and the like, and major elements of the invention described in the disclosure of the invention will be explained. That is, in the embodiment, and the like, the front cover 3 that is coupled to the engine that serves as a motor corresponds to "input member", the pump impeller 4 that is connected to the front cover 3 corresponds to "pump impeller", the turbine runner 5 that is rotatable together with the pump impeller 4 corresponds to "turbine runner", the damper mechanism 8 that includes the drive member 80 that serves as an input element, the intermediate member 83 that is engaged with the drive member 80 via the first coil springs 81 and the driven plate 84 that serves as an output element and that is engaged with the intermediate member 83 via the second coil springs 82 corresponds to "damper mechanism", the lock-up clutch mechanism 9 that is able to carry out lockup where the front cover 3 is coupled via the damper mechanism 8 to the damper hub 7 connected to the input shaft of the transmission and that is able to cancel the lockup corresponds to "lock-up clutch mechanism", the dynamic damper 10 that is formed of the coil springs 100 that serve as third elastic bodies and the turbine runner 5 that serves as a mass body and that is engaged with the coil springs 100 corresponds to "dynamic damper", and the centrifugal pendulum vibration absorber 20 that includes the support member 21 and the plurality of mass bodies 22 each oscillatable with respect to the support member 21 corresponds to "centrifugal pendulum vibration absorber".

However, the correlation between the major elements of the embodiment and the major elements of the invention described in the disclosure of the invention is one example for specifically explaining a mode in which the embodiment carries out the invention described in the disclosure of the invention, so the correlation does not intend to limit the elements of the invention described in the disclosure of the invention. That is, the embodiment is just one specific example of the invention described in the disclosure of the invention, and the interpretation of the invention described in the disclosure of the invention should be made on the basis of the description itself.

The mode for carrying out the present invention is described above with reference to the embodiment; however, the present invention is not limited to the above embodiment, and, of course, may be modified into various forms without departing from the scope of the present invention.

The present invention is usable in the manufacturing field, or the like, of a fluid transmission apparatus.

What is claimed is:

1. A fluid transmission apparatus comprising:
   a pump impeller that is connected to an input member coupled to a motor;
   a turbine runner that is rotatable together with the pump impeller;
   a damper mechanism that includes an input element, an intermediate element engaged with the input element via a first elastic body and an output element engaged with the intermediate element via a second elastic body;
   a lock-up clutch mechanism that is able to carry out lockup where the input member is coupled to an input shaft of a transmission via the damper mechanism and that is able to cancel the lockup;
   a dynamic damper that includes a mass body and a third elastic body engaged with the mass body; and
   a centrifugal pendulum vibration absorber that includes a support member and a plurality of mass bodies each oscillatable with respect to the support member, wherein
   the third elastic body of the dynamic damper is engaged with one of the intermediate element and output element of the damper mechanism, and the support member of the centrifugal pendulum vibration absorber is rigidly connected to the one or the other of the intermediate element and output element of the damper mechanism.

2. The fluid transmission apparatus according to claim 1, wherein
   the third elastic body is engaged with the output element of the damper mechanism, and the support member of the centrifugal pendulum vibration absorber is connected to the intermediate element of the damper mechanism.

3. The fluid transmission apparatus according to claim 2, wherein
   the mass body of the dynamic damper is the turbine runner that is engaged with the third elastic body.

4. The fluid transmission apparatus according to claim 3, wherein
   the support member of the centrifugal pendulum vibration absorber is fixed to the intermediate element of the damper mechanism via a coupling member, and the coupling member is fixed to the intermediate element on a radially outer side of one of the first and second elastic bodies of the damper mechanism, the one of the first and second elastic bodies being arranged on a radially inner side among the first and second elastic bodies.

5. The fluid transmission apparatus according to claim 4, wherein
   the plurality of mass bodies of the centrifugal pendulum vibration absorber are respectively supported by support shafts, and the support member of the centrifugal pendulum vibration absorber has a plurality of guide holes that respectively guide the support shafts such that the mass bodies oscillate with respect to the support member, and
   the guide holes are formed in the support member such that, when the coupling member is fixed to the support member of the centrifugal pendulum vibration absorber, the guide holes overlap with a fixing portion of the coupling member, which is fixed to the intermediate element, when viewed in an axial direction of the fluid transmission apparatus.

6. The fluid transmission apparatus according to claim 5, wherein
   the third elastic body is arranged on a radially inner side of the centrifugal pendulum vibration absorber, and the third elastic body and the centrifugal pendulum vibration absorber are arranged between the turbine runner and the damper mechanism when viewed in a radial direction of the fluid transmission apparatus.

7. The fluid transmission apparatus according to claim 2, wherein
   the support member of the centrifugal pendulum vibration absorber is fixed to the intermediate element of the damper mechanism via a coupling member, and the coupling member is fixed to the intermediate element on a radially outer side of one of the first and second elastic bodies of the damper mechanism, the one of the first and second elastic bodies being arranged on a radially inner side among the first and second elastic bodies.

8. The fluid transmission apparatus according to claim 7, wherein
   the plurality of mass bodies of the centrifugal pendulum vibration absorber are respectively supported by support shafts, and the support member of the centrifugal pendulum vibration absorber has a plurality of guide holes that respectively guide the support shafts such that the mass bodies oscillate with respect to the support member, and
   the guide holes are formed in the support member such that, when the coupling member is fixed to the support member of the centrifugal pendulum vibration absorber, the guide holes overlap with a fixing portion of the coupling member, which is fixed to the intermediate element, when viewed in an axial direction of the fluid transmission apparatus.

9. The fluid transmission apparatus according to claim 2, wherein
   the third elastic body is arranged on a radially inner side of the centrifugal pendulum vibration absorber, and the third elastic body and the centrifugal pendulum vibration absorber are arranged between the turbine runner and the damper mechanism when viewed in a radial direction of the fluid transmission apparatus.

* * * * *